(12) United States Patent
Slone et al.

(10) Patent No.: US 6,585,814 B2
(45) Date of Patent: Jul. 1, 2003

(54) TARTARIC ACID DIESTERS AS BIODEGRADABLE SURFACTANTS

(75) Inventors: Caroline Sassano Slone, Quakertown, PA (US); Kevin Rodney Lassila, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/081,686

(22) Filed: Feb. 20, 2002

(65) Prior Publication Data

US 2003/0033957 A1 Feb. 20, 2003

Related U.S. Application Data

(62) Division of application No. 09/544,671, filed on Apr. 6, 2000, now Pat. No. 6,423,376.

(51) Int. Cl.[7] .......................... A01N 25/30; C09D 11/00
(52) U.S. Cl. ..................................... 106/31.13; 504/100
(58) Field of Search ........................ 504/100; 106/31.13

(56) References Cited

U.S. PATENT DOCUMENTS

| | | | | |
|---|---|---|---|---|
| 2,172,465 A | * | 9/1939 | Demarest et al. ......... | 106/31.43 |
| 2,410,124 A | * | 10/1946 | Morgan .................... | 106/156.2 |
| 3,793,075 A | | 2/1974 | Maalouf .................... | 117/36.2 |
| 3,824,303 A | | 7/1974 | Lanzet et al. ................. | 424/47 |
| 3,985,691 A | | 10/1976 | De Taffin et al. ............. | 260/13 |
| 4,377,568 A | | 3/1983 | Chopra ........................ | 424/31 |
| 5,098,478 A | | 3/1992 | Krishnan et al. ............. | 106/23 |
| 5,196,136 A | | 3/1993 | Dishart et al. ............... | 252/170 |
| 5,562,762 A | | 10/1996 | Mrvos et al. ................. | 106/22 |
| 5,668,102 A | | 9/1997 | Severns et al. ............. | 510/504 |
| 5,691,989 A | | 11/1997 | Rakuljic et al. .............. | 372/20 |
| 5,985,925 A | | 11/1999 | Josso et al. ................. | 514/557 |
| 6,027,748 A | | 2/2000 | Conte et al. ................. | 424/458 |

FOREIGN PATENT DOCUMENTS

| | | |
|---|---|---|
| BE | 667241 | 11/1965 |
| DE | 878863 | 6/1953 |
| DE | 3011645 A1 | 10/1981 |
| DE | 4041184 A1 | 6/1992 |
| DE | 19621681 A1 | 12/1997 |
| EP | 0258814 B1 | 4/1993 |
| GB | 879508 | 10/1961 |
| GB | 893821 | 4/1962 |
| JP | 62101671 | 5/1987 |
| JP | 02308842 A2 | 12/1990 |

OTHER PUBLICATIONS

Gouck et al, J. Econ. Entom., 60(6), pp 1587–1590, 1967.*
Schwartz, J., "The Importance of Low Dynamic Surface Tension in Waterborne Coatings," *Journal of Coatings Technology* (1992).
Wirth, W., et al., "Mechanisms Controlling Leaf Retention of Agricultural Spray Solutions," *Pestic. Sci.*, 33, pp. 411–420 (1991).
Medina, S. W., et al., "Using Surfactants to Formulate VOC Compliant Waterased Inks," *American Ink Maker*, 72 (2), pp. 32–38 (1994).
Arantani, K., et al., "Preparation and Properties of Gemini Surfactants From Tartic Acid," *Commun. Jorn. Com. Esp. Deterg.*, 28, 48 (1998).
Ono, D., et al., "Preparation and Properties of Bis (sodium carboxylate) Types of Cleavable Surfactants Derived from Diethyl Tartrate and Fatty Carbonyl Compounds," *J. Jpn. Oil Chem. Soc.*, 42 (1), 10 (1993).
Beck et al., *Int. J. Pharm.* 141 (1,2), pp. 137–150, 1996.

* cited by examiner

*Primary Examiner*—Erma Cameron
(74) *Attorney, Agent, or Firm*—Michael Leach

(57) ABSTRACT

This invention provides water-based compositions which are essentially free of hydrocarbon solvents, particularly coating, ink, fountain solution, adhesive and agricultural compositions, manifesting reduced equilibrium and dynamic surface tension by the incorporation of a surface tension reducing amount of certain tartrate diester compounds of the structure:

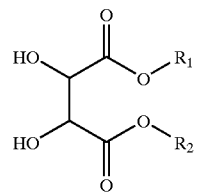

where $R_1$ and $R_2$ are C4 to C6 alkyl groups.

24 Claims, No Drawings

TARTARIC ACID DIESTERS AS BIODEGRADABLE SURFACTANTS

CROSS-REFERENCE TO RELATED APPLICATION

This application is a divisional application of application Ser. No. 09/544,671 filed Apr. 6, 2000 now U.S. Pat. No. 6,423,376.

FIELD OF THE INVENTION

The invention relates to the use of tartaric acid diesters to reduce the surface tension in water-based systems.

BACKGROUND OF THE INVENTION

The ability to reduce the surface tension of water is of great importance in waterborne coatings, inks, adhesives, fountain solutions and agricultural formulations because decreased surface tension translates to enhanced substrate wetting in actual formulations. Surface tension reduction in water-based systems is generally achieved through the addition of surfactants. Performance attributes resulting from the addition of surfactants include enhanced surface coverage, fewer defects, and more uniform distribution. Equilibrium surface tension performance is important when the system is at rest. However, the ability to reduce surface tension under dynamic conditions is of great importance in applications where high surface creation rates are utilized. Such applications include spraying, rolling and brushing of coatings or spraying of agricultural formulations, or high speed gravure or ink-jet printing. Dynamic surface tension is a fundamental quantity which provides a measure of the ability of a surfactant to reduce surface tension and provide wetting under such high speed application conditions.

Traditional nonionic surfactants such as alkylphenol or alcohol ethoxylates, and ethylene oxide (EO)/propylene oxide (PO) copolymers have excellent equilibrium surface tension performance but are generally characterized as having poor dynamic surface tension reduction. In contrast, certain anionic surfactants such as sodium dialkyl sulfosuccinates can provide good dynamic results, but these are very foamy and impart water sensitivity to the finished coating.

In addition to the development of high-performance surfactants, there is considerable interest in the industry in surfactants with improved environmental characteristics. Environmental concerns have led to an increased use of environmentally compatible surfactants as alternatives have become available. In addition, the use of less favorable products, such as alkylphenol ethoxylate (APE) surfactants, has declined. This is, in part, due to the poor environmental characteristics of APE surfactants, such as incomplete biodegradation and a suspicion that they may function as endocrine mimics. The demand for high-performance, eco-friendly surfactants has stimulated efforts in new surfactant development. From this work a new family of surfactants, referred to as alkyl polyglycoside (APG) surfactants, has emerged as a readily biodegradable, environmentally-friendly alternative to conventional surfactants. These materials, however, can be foamy and thus, are not suitable for a variety of coating, ink, adhesive and agricultural applications where the generation of foam is undesirable. Moreover, many APG surfactants possess poor color characteristics and are solids or pastes. This latter property complicates handling and necessitates the formation of blends which contain significantly less than 100% active ingredient. Thus, not only is it desirable to obtain surfactants which exhibit excellent surface tension reducing capabilities and low foam under dynamic application conditions, but it is also highly desirable that such new surfactants are environmentally-friendly, are liquids and possess little or no color.

There is a need for surfactants which exhibit good equilibrium and dynamic surface tension properties, are low-foaming, are low viscosity liquids to facilitate handling, have low color and low odor characteristics and would be widely accepted in the waterborne coating, ink, adhesive, fountain solution and agricultural formulation industries. Moreover, since there is substantial interest in the development of environmentally-friendly surfactants, an essential attribute would be that these surfactants not only possess the aforementioned desired performance attributes but also are derived from naturally occurring compounds or their synthetic equivalents or possess favorable biodegradation and toxicity properties.

The importance of reducing equilibrium and dynamic surface tension in applications such as coatings, inks, adhesives, fountain solutions and agricultural formulations is well-appreciated in the art.

Low dynamic surface tension is of great importance in the application of waterborne coatings. In an article, Schwartz, J. "*The Importance of Low Dynamic Surface Tension in Waterborne Coatings*", Journal of Coatings Technology, September 1992, there is a discussion of surface tension properties in waterborne coatings and a discussion of dynamic surface tension in such coatings. Equilibrium and dynamic surface tension were evaluated for several surface active agents. It is pointed out that low dynamic surface tension is an important factor in achieving superior film formation in waterborne coatings. Dynamic coating application methods require surfactants with low dynamic surface tensions in order to prevent defects such as retraction, craters, and foam.

Efficient application of agricultural products is also highly dependent on the dynamic surface tension properties of the formulation. In an article, Wirth, W.; Storp, S.; Jacobsen, W. "*Mechanisms Controlling Leaf Retention of Agricultural Spray Solutions*"; Pestic. Sci. 1991, 33, 411–420, the relationship between the dynamic surface tension of agricultural formulations and the ability of these formulations to be retained on a leaf was studied. These workers observed a good correlation between retention values and dynamic surface tension, with more effective retention of formulations exhibiting low dynamic surface tension.

Low dynamic surface tension is also important in high-speed printing as discussed in the article "*Using Surfactants to Formulate VOC Compliant Waterbased Inks*", Medina, S. W.; Sutovich, M. N. *Am. Ink Maker* 1994, 72 (2), 32–38. In this article, it is stated that equilibrium surface tensions (ESTs) are pertinent only to ink systems at rest. EST values, however, are not good indicators of performance in the dynamic, high speed printing environment under which the ink is used. Dynamic surface tension is a more appropriate property. This dynamic measurement is an indicator of the ability of the surfactant to migrate to a newly created ink/substrate interface to provide wetting during high speed printing.

U.S. Pat. No. 5,098,478 discloses water-based ink compositions comprising water, a pigment, a nonionic surfactant and a solubilizing agent for the nonionic surfactant. Dynamic surface tension in ink compositions for publication gravure printing must be reduced to a level of about 25 to 40 dynes/cm to assure that printability problems will not be encountered.

U.S. Pat. No. 5,562,762 discloses an aqueous jet ink of water, dissolved dyes and a tertiary amine having two polyethoxylate substituents and that low dynamic surface tension is important in ink jet printing.

Esters of tartaric acid (2,3-dihydroxy-butanedioic acid), also called tartrates, are known. Tartaric acid has been utilized to produce surfactants.

EP 0 258 814 B1 discloses mono-, di- or tri-esters of carboxylic hydroxyacids of the structure:

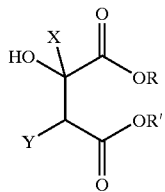

as surface active agents, where X=CH$_2$COOR" or H; Y=OH or H; R, R' and R"=H. alkaline earth or alkali metal, ammonium group or a radical from etherified C$_6$–C$_{16}$ alkyl polysaccharides or hydroxy C$_6$–C$_{16}$ alkyl polyalcohols.

Aratani et al., "Preparation and Properties of Gemini Surfactants From Tartric Acid", Commun. Jorn. Com. Esp. Deterg., 1998, 28, 48 prepared anionic surfactants from tartaric acid by alkylation of the hydroxy groups and conversion of the carboxyl groups of the resulting tartaric acid ether to hydrophilic moieties. The surfactants studied were of the following structure, where R=alkyl group, A=CO$_2^-$M$^+$, CH$_2$OSO$_3^-$M$^+$, CH$_2$SO$_3^-$M$^+$, CH$_2$N$^+$R$_3$X$^-$, M=Na$^+$ or K$^+$ and X=Cl, Br, I.

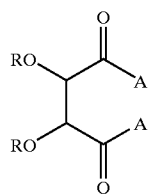

Ono, D., et al., "Preparation and Properties of Bis(sodium carboxylate) Types of Cleavable Surfactants Derived from Diethyl Tartrate and Fatty Carbonyl Compounds"; J. Jpn. Oil Chem. Soc. 1993, 42, 10 disclose bis(sodium carboxylate) surfactants with a 1,3-dioxalane ring obtained from diethyl tartrate and various ketones or aldehydes. Following is an example of this type of surfactant where R=alkyl group and R'=H or CH$_3$.

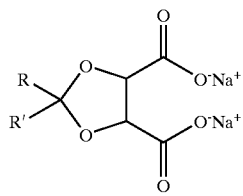

JP 62101671 discloses the use of C4 to C18 mono- or di-esters of oxyacids as lubricants in water soluble ink compositions for writing instruments. Example 3 shows a red-colored water-soluble ink containing dibutyl tartrate.

U.S. Pat. No. 3,824,303 discloses C1 to C4 diester lubricants and surfactants in a water-alcohol vehicle in collapsible foam pre-electric shave lotions. Stable foams were formed by the disclosed lotion containing diester lubricants, including among the numerous suggested compounds are diethyl- and diisobutyl tartrates although neither is shown in any example.

DE 40 41 184 A1 discloses C1–C22 esters and amides of tartaric, citric, succinic, maleic, nitrilotriacetic and ethylenediamine tetraacetic acids as oil defoamers in papermaking. Effective defoamers were at least ⅓ esterified or amidated, preferably ⅓–⅔ esterified or amidated with long chain C8–C22 fatty alcohols. The examples only show use of citric acid derivatives.

DE 3 011 645 A1 discloses the use of mixed esters of hydroxycarboxylic acids as dispersion aids for the aqueous suspension polymerization of vinyl chloride.

DE 878 863 discloses organic oxy acid esters as dispersants in preparation of pearl-shaped or granular polymerization products. All diesters of tartaric acid contained alkyl groups of at least 8 carbon atoms.

BE 667,241 discloses a process for the treatment of a pigment in water or a solvent with an organic compound containing at least 2 hydroxyl groups and at least a C2 to C20 ester of a carboxylic acid. The examples disclose the use of diethyl tartrate, dibutyl tartrate and di(2-ethylhexyl) tartrate in aqueous pigment suspensions.

GB 893,821 discloses a process for the production of flushed pigments in which a solid flushing agent is mixed with an aqueous pigment dispersion and then heated to melt the flushing agent and remove water. Flushing agents are esters of di- and tri-carboxylic acids (examples include diisobutyl tartrate). All flushed pigments were used in organic solvent-based lacquers.

DE 19 621 681 A1 discloses aqueous pearl luster concentrates comprising esters of polyvalent carboxylic acids and/or hydroxycarboxylic acids with fatty alcohols in conjunction with emulsifiers and polyols. The mono- or diesters of C6 to C22 alcohols were used to impart a pearl luster to "surface active agents" for use in hair shampoo and manual dishwashing detergents. Among the suggested acids is tartaric acid.

U.S. Pat. No. 5,668,102 discloses acid esters of C1–C22 perfume alcohols as long-lived perfume agents in biodegradable fabric softeners. The esters studied provided long-lived perfumes through gradual release of perfume alcohols. In particular, esters prepared from alcohols with 8 carbons and up were studied in aqueous liquid fabric softener compositions.

U.S. Pat. No. 5,196,136 discloses cleaning compositions comprising multibasic esters, including dibutyltartrate, a surfactant and a hydrocarbon solvent and emulsions or dispersions of multibasic esters, a surfactant and hydrocarbon in water. Such cleaning compositions are used to remove flux residues from printed circuit boards.

GB 879 508 discloses the use of water insoluble esters as emulsion additives for bleaching baths comprising aqueous alkali metal chlorite. Dibutyltartrate is given as an example for cellulose fiber treatment.

SUMMARY OF THE INVENTION

This invention provides water-based compositions which are essentially free of hydrocarbon solvent and contain an organic or inorganic compound, particularly aqueous organic coating, ink, adhesive, fountain solution and agricultural compositions, having reduced equilibrium and dynamic surface tension by incorporation of an effective amount of a diester of tartaric acid of the following structure:

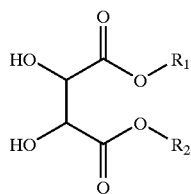

where $R_1$ and $R_2$ are independently a C4 to C6 alkyl group, but preferably are the same; provided that when the water-based composition is an ink, $R_1$ and $R_2$ are independently a C5 or C6 alkyl group. It is desirable that an aqueous solution of the diester demonstrates a dynamic surface tension of less than 45 dynes/cm at a concentration of $\leq 5$ wt % in water at 25° C. and 20 bubble/second according to the maximum-bubble pressure method. The maximum-bubble-pressure method of measuring surface tension is described in *Langmuir* 1986, 2, 428–432, which is incorporated by reference.

By "water-based", "aqueous" or "aqueous medium", we mean, for purposes of this invention, a solvent or liquid dispersing medium which comprises at least 90 wt %, preferably at least 95 wt %, water. Obviously, an all water medium is also included.

Also provided is a method for lowering the equilibrium and dynamic surface tension of such aqueous compositions by the incorporation of these diester compounds.

Also provided is a method for applying a coating of a water-based inorganic or organic compound-containing composition to a surface to partially or fully coat the surface with the water-based composition and drying the composition to deposit a coating, the composition containing an effective amount of a diester compound of the above structure for reducing the dynamic surface tension of the water-based composition.

There are significant advantages associated with the use of these diesters in water-based organic coatings, inks, adhesives, fountain solutions and agricultural compositions and these advantages include:

water-borne coatings, inks, adhesives, fountain solutions and agricultural compositions which may be applied to a variety of substrates with excellent wetting of substrate surfaces including contaminated and low energy surfaces;

a reduction in coating or printing defects such as orange peel and flow/leveling deficiencies;

coating and ink compositions capable of high speed application;

low-foam surfactants capable of reducing dynamic surface tension;

low-foam surfactants many of which are low viscosity liquids at room temperature for facile handling;

low-foam surfactants which have low odor and color;

water-borne coatings and inks which have low volatile organic content, thus making these formulations environmentally favorable;

water-borne compositions using a surfactant derived from natural acids or synthetic equivalents, thus making such compositions environmentally favorable; and low-foam surfactants which exhibit good biodegradation characteristics and thus, are environmentally favorable.

Because of their excellent surfactant properties and the ability to control foam, these materials are likely to find use in many applications in which reduction in dynamic and equilibrium surface tension and low foam are important.

Applications in which low foam is important include various wet-processing textile operations, such as dyeing of fibers, fiber scouring, and kier boiling, where low-foaming properties would be particularly advantageous; they may also have applicability in soaps, water-based perfumes, shampoos, detergents, cosmetics and food processing where their marked ability to lower surface tension while simultaneously producing substantially no foam would be highly desirable.

DETAILED DESCRIPTION OF THE INVENTION

This invention relates to the use of compounds of the structure:

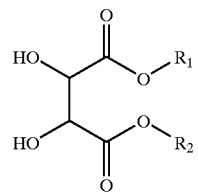

where $R_1$ and $R_2$ are independently a C4–C6 alkyl group, preferably $R_1=R_2$, for the reduction of equilibrium and dynamic surface tension in water-based compositions which are essentially free of aliphatic and aromatic hydrocarbon solvents and contain an organic compound, particularly coating, ink, fountain solution, adhesive and agricultural compositions containing organic compounds such as polymeric resins, herbicides, fungicides, insecticides or plant growth modifying agents. It is desirable that an aqueous solution of the tartrate diester demonstrates a dynamic surface tension of less than 45 dynes/cm at a concentration of $\leq 5$ wt % in water at 25° C. and 20 bubble/second according to the maximum-bubble-pressure method. The maximum-bubble-pressure method of measuring surface tension is described in *Langmuir* 1986, 2, 428–432, which is incorporated by reference.

In one aspect of the invention the tartrate diesters of the above formula display excellent ability to reduce equilibrium and dynamic surface tension while producing substantially no foam.

These tartrates may be prepared by esterification of tartaric acid with an alcohol.

The reaction is illustrated below:

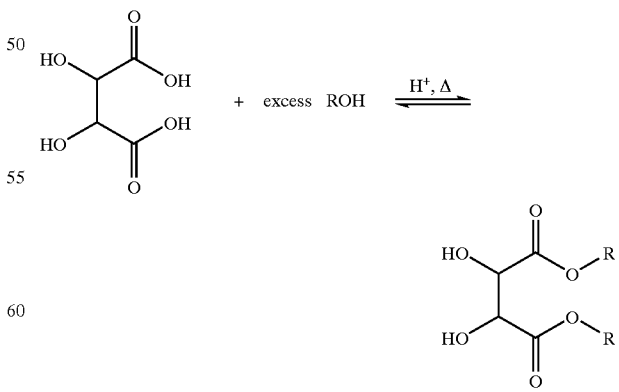

For the purpose of this invention all stereoisomers of tartaric acid are suitable, including L-tartaric acid, D-tartaric acid and DL-tartaric acid.

The esterification reaction may be performed using many catalysts and processes as described in the *Kirk-Othmer Encyclopedia of Chemical Technology*, 4th Ed., Vol. 9, p. 755–780. The reaction is preferentially catalyzed by an acid. Examples of suitable acid catalysts are acidic ion exchange resins (i.e. Amberlyst®15 resin), p-toluenesulfonic acid, boron trifluoride etherate and mineral acid catalysts, such as hydrochloric acid and sulfuric acid. In addition, the esterification reaction may be driven by removal of the water by-product. In this case, the water may be removed as an azeotrope, typically with the alcohol used in the reaction. Other suitable methods to remove water include the use of a drying agent. Also, solvents may be added to the reaction to aid the dissolution of tartaric acid or to facilitate azeotropic removal of water.

All alcohols or mixtures of alcohols containing the requisite C3 to C6 alkyl substituents may be utilized for the preparation of the dialkyltartrates of this invention with alcohols containing a 3–5 carbons being preferred and those containing 5 carbons being especially preferred. Alkyl groups which are suitable should have sufficient carbon to confer surface activity (i.e. an ability to reduce the surface tension of water) to the material but not enough carbon to decrease the solubility to the extent that the ability of the material to reduce surface tension is insufficient for a particular application. In general, an increase in the carbon number increases the efficiency of the resulting dialkyltartrate (i.e. less surfactant is required to obtain a given decrease in surface tension), but decreases its ability to reduce surface tension at high surface creation rates. The latter effect is a result of the fact that increased carbon number generally decreases the water solubility of the material, and consequently, diminishes the diffusive flux of surfactant to newly-created surface. Generally, in the practice of this invention, it is desirable to choose alkyl groups such that the resulting dialkytartrates have a solubility limit in water from 0.005 to 5 wt %, preferably from 0.1 to 2 wt %, and most preferably from 0.1 to 0.5 wt %.

The alkyl groups in the tartrates of this invention may be the same or different. However, symmetrical diesters are preferred due to ease in synthesis. Alkyl groups may be linear or branched, with alkyl groups containing branching being preferred. The total number of carbons on $R_1$ and $R_2$ should be $\leq 8$; fewer than this diminishes the surface activity of the dialkyltartrate too greatly. The total number of carbons should be $\leq 12$; a greater number decreases the solubility of the material to such a degree that its use in many formulations is impractical. Examples of suitable alkyl groups are n-butyl, isobutyl, sec-butyl, n-pentyl, 2-pentyl, 3-pentyl, isopentyl, neopentyl, cyclopentyl, 2-methylbutyl, 3-methyl-2-butyl, n-hexyl, 2-hexyl, 3-hexyl, cyclohexyl, 2-ethylbutyl, 4-methyl-2-pentyl and so on. Preferred derivatives are those in which $R_1=R_2$ and contain a total of 8 to 12 alkyl carbons. Of these derivatives those which contain 8 to 10 alkyl carbons are preferred. Derivatives containing 10 alkyl carbons are the most preferred, especially in the case where $R_1=R_2=$isoamyl.

An amount of dialkyl tartrate compound that is effective to reduce the equilibrium and/or dynamic surface tension of the water-based, organic compound-containing composition is added. Such effective amount may range from 0.001 to 20 wt %, preferably 0.01 to 10 wt %, and most preferably 0.05 to 5 wt %, of the aqueous composition. Naturally, the most effective amount will depend on the particular application and the solubility of the dialkyltartrate.

The diesters are suitable for use in an aqueous composition comprising in water an inorganic compound which is a mineral ore or a pigment or an organic compound which is a pigment, a polymerizable monomer, such as addition, condensation and vinyl monomers, an oligomeric resin, a polymeric resin, a detergent, a cleaning agent, a herbicide, a fungicide, an insecticide, or a plant growth modifying agent.

In the following water-based organic coating, ink, adhesive, fountain solution and agricultural compositions containing a dialkyltartrate according to the invention, the other listed components of such compositions are those materials well known to the workers in the relevant art.

A typical water-based protective or decorative organic coating composition to which the tartrate diester surfactants of the invention may be added would comprise in an aqueous medium 30 to 80 wt % of a coating composition containing the following components:

| Water-Based Organic Coating Composition | |
| --- | --- |
| 0 to 50 wt % | Pigment Dispersant/Grind Resin |
| 0 to 80 wt % | Coloring Pigments/Extender Pigments/Anti-Corrosive Pigments/Other Pigment Types |
| 5 to 99.9 wt % | Water-Borne/Water-Dispersible/Water-Soluble Resins |
| 0 to 30 wt % | Slip Additives/Antimicrobials/Processing Aids/Defoamers |
| 0 to 50 wt % | Coalescing or Other Solvent |
| 0.01 to 10 wt % | Surfactant/Wetting Agent/Flow and Leveling Agents |
| 0.01 to 5 wt % | Dialkyltartrate |

A typical water-based ink composition to which the diester surfactants of the invention may be added would comprise in an aqueous medium 20 to 60 wt % of an ink composition containing the following components:

| Water-Based Ink Composition | |
| --- | --- |
| 1 to 50 wt % | Pigment |
| 0 to 50 wt % | Pigment Dispersant/Grind Resin |
| 0 to 50 wt % | Clay base in appropriate resin solution vehicle |
| 5 to 99.9 wt % | Water-Borne/Water-Dispersible/Water-Soluble Resins |
| 0 to 30 wt % | Coalescing or Other Solvent |
| 0.01 to 10 wt % | Surfactant/Wetting Agent |
| 0.01 to 10 wt % | Processing Aids/Defoamers/Solubilizing Agents |
| 0.01 to 5 wt % | Dialkyltartrate |

A typical water-based agricultural composition to which the diester surfactants of the invention may be added would comprise in an aqueous medium 0.1 to 80 wt % of an agricultural composition containing the following components:

| Water-Based Agricultural Composition | |
| --- | --- |
| 0.1 to 50 wt % | Pesticide, Insecticide, Herbicide or Plant Growth Modifying Agent |
| 0.01 to 10 wt % | Surfactant |
| 0 to 5 wt % | Dyes |
| 0 to 20 wt % | Thickeners/Stabilizers/Co-surfactants/Gel Inhibitors/Defoamers |
| 0 to 25 wt % | Antifreeze |
| 0.01 to 50 wt % | Dialkyltartrate |

A typical water-based fountain solution composition would the following components:

| Water-Based Fountain Solution | |
|---|---|
| 0.05 to 10 wt % | Film formable, water soluble macromolecule |
| 1 to 25 wt % | Alcohol, glycol, or polyol with 2–12 carbon atoms, water soluble or can be made to be water soluble |
| 0.01 to 20 wt% | Water soluble organic acid, inorganic acid, or a salt thereof |
| 30 to 70 wt % | Water |
| 0.01 to 5 wt % | Dialkyltartrate |

A typical water-based adhesive composition to which the dialkyltartrate surfactants of the invention may be added would comprise in an aqueous medium 30 to 65 wt % of an adhesive composition containing the following components:

| Water-Based Adhesive | |
|---|---|
| 50 to 99 wt % | Polymeric Resin (SBR, VAE, Acrylic) |
| 0 to 50 wt % | Tackifier |
| 0 to 0.5 wt % | Defoamer |
| 0.5 to 2 wt % | Dialkyltartrate |

With the exception of diisopropyl-D-tartrate and dibutyl-L-tartrate, which were available commercially, all tartrates in the following examples were synthesized and characterized via Gas Chromatography/Mass Spectrometry (GC/MS) and Nuclear Magnetic Resonance (NMR) spectroscopy. All dialkyltartrates prepared ranged from >96% to >99% pure.

EXAMPLE 1

Diisopropyl-D-tartrate was purchased from Aldrich Chemical Company and used as received. The compound was a low viscosity, clear colorless liquid with no detectable odor.

EXAMPLE 2

Dibutyl-L-tartrate was purchased was purchased from TCI America and used as received. The compound was a low viscosity, clear colorless liquid with a slight, pleasant odor.

EXAMPLE 3

Diisobutyl-DL-tartrate was prepared by esterification of DL-tartaric acid with isobutyl alcohol. To a three-neck 1L round-bottomed flask equipped with a reflux condenser, Dean-Stark trap, septum, thermocouple and mechanical stirrer, were added DL-tartaric acid (101.85 g), 2-methyl-1-propanol (250 mL) and Amberlyst®15 ion exchange resin (15.3 g). The mixture was placed under nitrogen and heated to reflux. At 105° C., 2 phases started to collect in the Dean-Stark trap. The reaction temperature was maintained at 105° C. for 2 hr and the water was continuously removed via the Dean-Stark trap. As collection in the Dean-Stark trap slowed, the reaction temperature was increased to 120° C. over 3 hr. At this point, no more water collected in the Dean-Stark trap. The product was separated from the catalyst via filtration and the catalyst was washed with diethyl ether. The resulting light yellow solution was washed twice with saturated sodium bicarbonate (200 mL), dried over MgSO$_4$ and concentrated via rotary evaporation. The crude yellow liquid was purified via vacuum distillation. Diisobutyl-DL-tartrate was obtained as a white solid with a slight pleasant odor (148.24 g, 83.3% yield).

EXAMPLE 4

Di-sec-butyl-DL-tartrate was prepared using a procedure similar to that in Example 3 with p-toluenesulfonic acid as the catalyst. To the reaction flask, DL-tartaric acid (101.10 g), 2-butanol (371 mL) and p-toluenesulfonic acid (12.8 g) were added. The mixture was placed under nitrogen and heated to reflux. At 98° C., 1 phase started to collect in the Dean-Stark trap. The reaction was maintained at 98–100° C. for 1 hr and then heated to 105° C. for 4 hr. During this time, the water/alcohol azeotrope was removed as fresh alcohol (250mL) was added. The reaction was then heated to 121° C. over 1 hr to remove the most of the 2-butanol. The product was dissolved in diethyl ether, washed with saturated sodium bicarbonate (100 mL) 4 times, washed once with water, and dried over magnesium sulfate. Diethyl ether was removed via rotary evaporation. Di-sec-butyl-DL-tartrate was obtained as a low viscosity, slightly hazy colorless liquid with no detectable odor (162.96 g, 92.2% yield) after pumping on the sample in vacuo to remove residual 2-butanol.

EXAMPLE 5

Dipentyl-DL-tartrate was prepared using a procedure similar to that in Example 3. To the reaction flask, DL-tartaric acid (90.68 g), 1-pentanol (265 mL) and Amberlyst®15 ion exchange resin (14.0 g) were added. The mixture was placed under nitrogen and heated to reflux. At 118+ C., 2 phases started to collect in the Dean-Stark trap. The reaction was maintained at 119–121° C. for 2 hr and 30 min and water was continuously removed. The reaction was then heated to 125° C. for 1 hr. At this point, no more water collected in the Dean-Stark trap. The product was separated from the catalyst via filtration over silica using 100 mL diethyl ether. The organic layer was washed 3 times with saturated sodium bicarbonate (200 mL), washed once with water, and dried over magnesium sulfate. Diethyl ether was removed via rotary evaporation. Dipentyl-DL-tartrate was obtained as a low viscosity, slightly hazy, light yellow liquid with a slight pleasant odor (144.91 g, 82.5% yield) after pumping on the sample in vacuo to remove residual 1-pentanol.

EXAMPLE 6

Diisoamyl-DL-tartrate was prepared using a procedure similar to that in Example 3. To the reaction flask, DL-tartaric acid (100.04 g), 3-methyl-1-butanol (293 mL) and Amberlyst®15 ion exchange resin (15.3 g) were added. The mixture was placed under nitrogen and heated to reflux. At 115° C., 2 phases started to collect in the Dean-Stark trap. The reaction was maintained at 115° C. for 4 hr and 30 min, during this time water was continuously removed. The reaction was then heated to 120° C. for 1 hr and 30 min. At this point, no more water collected in the Dean-Stark trap. The product was dissolved in diethyl ether and separated from the catalyst via filtration over a bed of silica. The organic layer was washed with saturated sodium bicarbonate (200 mL) 3 times, washed once with water, and dried over magnesium sulfate. Diethyl ether was removed via rotary evaporation. Diisoamyl-DLtartrate was obtained as a low viscosity, clear colorless liquid with a slight odor (153.39 g, 83.8% yield) after pumping on the sample in vacuo to remove residual 3-methyl-1-butanol.

EXAMPLE 7

Di(2-methyl-butyl)-DL-tartrate was prepared using a procedure similar to that in Example 3. To the reaction flask, DL-tartaric acid (90.87 g), 2-methyl-1-butanol (265 mL) and Amberlyst®15 ion exchange resin (14.0 g) were added. The mixture was placed under nitrogen and heated to reflux. At 116° C., 2 phases started to collect in the Dean-Stark trap. The reaction was then heated to 120° C. over 1 hr. During this time, the water/alcohol azeotrope was removed. After 1.5 hr, the reaction temperature was increased to 125° C. for 1 hr and 20 min. Once water ceased to collect in the Dean-Stark trap, the product was diluted with diethylether, collected via filtration over a short bed of silica, washed 3 times with saturated sodium bicarbonate (200 mL), once with water and dried over magnesium sulfate. The diethyl ether was removed via rotary evaporation. Di-(2-methyl-butyl)-DL-tartrate was obtained as a low viscosity, clear light yellow liquid with no detectable odor (150.03 g, 85.3% yield) after removing residual 2-methyl-1-butanol via vacuum distillation.

EXAMPLE 8

Dineopentyl-DL-tartrate was prepared using a procedure similar to that in Example 4. First, 2,2-dimethyl-propanol (196.2 g) was melted at 75° C. and added to the reaction flask. To the alcohol, were added DL-tartaric acid (83.53 g) and p-toluenesulfonic acid (10.6 g) were added. The mixture was placed under nitrogen and heated to reflux. At 103° C., 2 phases started to collect in the Dean-Stark trap. The reaction temperature was increased to 120° C. over 2 hr and 15 min. At this point, no more liquid collected in the trap. The product was neutralized with saturated sodium bicarbonate (100 mL), diluted with diethyl ether and water, washed 3 times with saturated sodium bicarbonate (100 mL), once with water and dried over magnesium sulfate. The diethyl ether was removed via rotary evaporation. Dineopentyl-DL-tartrate was obtained as a white solid with a slight pleasant odor (144.46 g, 89.3% yield) after removing residual 2,2-dimethyl-propanol via vacuum distillation.

EXAMPLE 9

Dihexyl-DL-tartrate was prepared using a procedure similar to that in Example 4. To the reaction flask, DL-tartaric acid (100.59 g), hexyl alcohol (340 mL) and p-toluenesulfonic acid (12.8 g) were added. The mixture was placed under nitrogen and heated to reflux. At 112° C., 2 phases started to collect in the Dean-Stark trap. The reaction temperature was slowly increased to 135° C. over 3 hr. At this point, no more liquid collected in the trap. The product was neutralized with saturated sodium bicarbonate (200 mL), diluted with diethyl ether, washed 2 times with saturated sodium bicarbonate (200 mL), once with water and dried over magnesium sulfate. The diethyl ether was removed via rotary evaporation. Dihexyl-DL-tartrate was obtained as a low viscosity, light yellow liquid with a slight pleasant odor (171.05 g, 80.9% yield) after removing residual hexyl alcohol via vacuum distillation.

EXAMPLE 10

Di(4-methyl-2-pentyl)-DL-tartrate was prepared using a procedure similar to that in Example 4 with 1,4-dioxane added as a solvent. To the reaction flask, DL-tartaric acid (60.28 g), 4-methyl-2-pentanol (210 mL), 1,4-dioxane (150 mL) and p-toluenesulfonic acid (11.6 g) were added. The mixture was placed under nitrogen and heated to reflux. At 102° C., 1 phase started to collect in the Dean-Stark trap. After 1 hr at 105° C., the temperature was slowly increased to 120° C. over 1 hr. After 30 min at 120° C., no more liquid collected in the trap. The reaction product was neutralized with saturated sodium bicarbonate (200 mL), diluted with diethyl ether, washed 2 times with saturated sodium bicarbonate (200 mL), once with water and dried over magnesium sulfate. The diethyl ether was removed via rotary evaporation. Di(4-methyl-2-pentyl)-DL-tartrate was obtained as a oily light yellow solid with no detectable odor (73.5 g, 57.5% yield) after removing residual 4-methyl-2-pentanol via vacuum distillation.

EXAMPLE 11

Dibenzyl-DL-tartrate was prepared using the method of Lee et al. [*J. Chem. Soc. Perkin Trans. I*, 1995, 2877]. To a three-neck 1L round-bottomed flask equipped with a reflux condenser, Dean-Stark trap, thermocouple and mechanical stirrer, were added DL-tartaric acid (82.08 g), benzyl alcohol (114 g), toluene (550 mL) and p-toluenesulfonic acid (1.04 g). The mixture was placed under nitrogen and heated to reflux. At 112° C., 2 phases started to collect in the Dean-Stark trap. The reaction temperature was increased to 115° C. over 4 hr and then allowed to stir at room temperature overnight. To aid the dissolution of DL-tartaric acid, 1,4-dioxane (180 mL) was added. At 105° C., 2 phases started to collect in the Dean-Stark trap. After 3 hr at 108–109° C., the reaction was not complete and the reaction was again allowed to stir at room temperature overnight. The reaction was continued by heating at 108° C. for an additional 2 hr. At this point, the crude product was neutralized with saturated sodium bicarbonate and poured into a separatory funnel. The organic layer was washed with saturated sodium bicarbonate 3 times, washed once with water, and dried over magnesium sulfate. The toluene, 1,4-dioxane and diethyl ether were removed via rotary evaporation. The benzyl alcohol was removed via vacuum distillation to yield a white solid. The crude solid was recrystallized from methanol and subsequently from ethanol. The resulting dibenzyl-DL-tartrate white solid with no detectable odor was dried in vacuo (59.9 g, 30.3% yield).

EXAMPLE 12

Di(2-ethylhexyl)-DL-tartrate was prepared using a procedure similar to that in Example 3. To the reaction flask, DL-tartaric acid (150.09 g), 2-ethylhexyl alcohol (1100 mL) and Amberlyst®15 ion exchange resin (38.58 g) were added. The mixture was placed under nitrogen and heated to reflux. At 127° C., 2 phases started to collect in the Dean-Stark trap. The reaction temperature was maintained at 125–126° C. for 2.5 hr and then at 135° C. for 2 hr. After stirring at room temperature overnight, di(2-ethylhexyl)-DL-tartrate was obtained as a low viscosity, light amber liquid with a no odor (365.04 g, 55.6% yield) after removing water and residual 2-ethylhexyl alcohol via vacuum distillation.

In the following Examples dynamic surface tension data were obtained for aqueous solutions of various compounds using the maximum bubble pressure method at bubble rates from 0.1 bubbles/second (b/s) to 20 b/s. These data provide information about the performance of a surfactant at conditions from near-equilibrium (0.1 b/s) through extremely high surface creation rates (20 b/s). In practical terms, high bubble rates correspond to high printing speeds in lithographic printing, high spray or roller velocities in coating applications, and rapid application rates for agricultural products.

EXAMPLE 13

Dynamic surface tension data were obtained for a 0.1 wt % aqueous solution of the 9.5 mole ethoxylate of nonylphenol using the maximum bubble pressure method at bubble rates from 0.1 bubbles/second (b/s) to 20 b/s.

The data in the Table 1 illustrate that for a conventional surfactant such as the 9.5 mole ethoxylate of nonylphenol, the surface tension at the low surface creation rate of 0.1 b/s is low (33.2 dyne/cm), but that the surface tension increases rapidly with surface creation rate to 56.2 dyne/cm at 20 b/s. These data indicate that this surfactant would not be suitable for use in high speed lithographic printing or application of coatings, or rapid application of agricultural products.

TABLE 1

9.5 Mole Ethoxylate of Nonylphenol.

Dynamic Surface Tension (dyne/cm)

| concentration | (0.1 b/s) | (1 b/s) | (6 b/s) | (15 b/s) | (20 b/s) |
|---|---|---|---|---|---|
| 0.1 wt % | 33.2 | 36.7 | 44.3 | 52.8 | 56.2 |

EXAMPLES 14–25

Solutions of the materials of Examples 1–12 in distilled water were prepared. Their dynamic surface tension was evaluated as in Comparative Example 13, and these data were used to determine the quantities provided in the Table 2. The $pC_{20}$ value is defined as the negative logarithm of the molar concentration of surfactant required to decrease the surface tension of an aqueous solution to 52.1 dyne/cm, that is, 20 dyne/cm below that of pure water when the measurement is performed at 0.1 b/s. This value is a measure of the efficiency of a surfactant. In general, an increase in $pC_{20}$ value of 1.0 indicates that 10 times less surfactant will be required to observe a given effect. In addition, the relative efficiency of surfactants can be obtained by comparing surface tension reduction of solutions containing the same amount of different surfactants. Such data is given for 0.1 wt % solutions of the tartrates at 1.0 and 6.0 bubbles/second (b/s). The solubility limit was determined by intersection of the linear portion of a surface tension/ln concentration curve with the limiting surface tension as is described in many textbooks. The limiting surface tensions at 0.1, 1, 6 and 20 b/s represent the lowest surface tensions in water which can be achieved at the given surface creation rates for a given surfactant regardless of the amount of surfactant used and is used to evaluate the effectiveness of a surfactant. These values give information about the relative ability to a surfactant to reduce surface defects under near-equilibrium conditions (0.1 b/s) through very dynamic conditions (20 b/s). Lower surface tensions would allow the elimination of defects upon application of a formulation onto lower energy surfaces.

TABLE 2

Surface Tension Data for Dialkyltartrate Surfactants

| | Structure | solubility limit[a] | $pC_{20}$ | limiting γ[b] | | | | γ(0.1 wt % solution)[b] | |
|---|---|---|---|---|---|---|---|---|---|
| | | | | (0.1 b/s) | (1 b/s) | (6 b/s) | (20 b/s) | (1 b/s) | (6 b/s) |
| Example 14 (Example 1) | 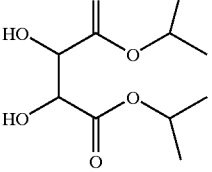 | >5% | 1.6 | 39.7 | 39.9 | 39.9 | 41.0 | 61.6 | 62.1 |
| Example 15 (Example 2) | 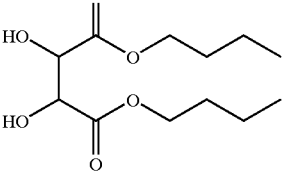 | 1.1 | 2.7 | 34.5 | 34.8 | 35.0 | 36.2 | 50.3 | 51.1 |
| Example 16 (Example 3) | 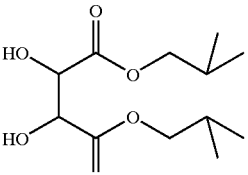 | 0.7 | 2.6 | 38.7 | 39.3 | 39.8 | 40.8 | 50.6 | 51.4 |
| Example 17 (Example 4) | 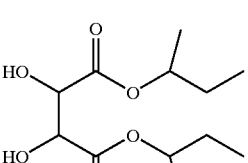 | 1.7 | 2.5 | 35.1 | 35.0 | 35.0 | 36.0 | 52.2 | 53.2 |

TABLE 2-continued

Surface Tension Data for Dialkyltartrate Surfactants

| | Structure | solubility limit[a] | pC$_{20}$ | limiting γ[b] | | | | γ(0.1 wt % solution)[b] | |
|---|---|---|---|---|---|---|---|---|---|
| | | | | (0.1 b/s) | (1 b/s) | (6 b/s) | (20 b/s) | (1 b/s) | (6 b/s) |
| Example 18 (Example 5) | | 0.1 | 3.3 | 35.9 | 36.8 | 37.8 | 41.6 | 36.8 | 37.8 |
| Example 19 (Example 6) | | 0.1 | 3.7 | 34.9 | 35.7 | 37.2 | 40.3 | 35.4 | 36.7 |
| Example 20 (Example 7) | | 0.1 | 3.2 | 35.6 | 36.0 | 36.0 | 38.5 | 39.0 | 39.8 |
| Example 21 (Example 8) | | 0.2 | 3.5 | 35.1 | 35.5 | 36.1 | 38.4 | 38.7 | 39.8 |
| Example 22 (Example 9) | | 0.01 | 3.8 | 40.5 | 59.0 | 65.9 | 70.0 | 59.0 | 65.9 |
| Example 23 (Example 10) | | 0.02 | 3.7 | 41.3 | 49.9 | 56.1 | 68.2 | 42.2 | 46.8 |
| Example 24 (Example 11) | | 0.05 | 1.0 | 64.0 | 68.1 | 69.8 | 72.5 | 67.8 | 70.0 |

TABLE 2-continued

Surface Tension Data for Dialkyltartrate Surfactants

| Structure | solubility limit[a] | pC$_{20}$ | limiting γ[b] | | | | γ(0.1 wt % solution)[b] | |
| --- | --- | --- | --- | --- | --- | --- | --- | --- |
| | | | (0.1 b/s) | (1 b/s) | (6 b/s) | (20 b/s) | (1 b/s) | (6 b/s) |
| Example 25 (Example 12) | 0.06 | 1.6 | 66.7 | 69.8 | 70.5 | 71.3 | 69.8 | 70.5 |

[a]Weight %
[b]Dyne/cm
[c]Limiting γ at 0.1 wt. % surfactant. At 5 wt. % di(2-ethylhexyl)-DL-tartrate a cloudy mixture was observed with a limiting γ of 38.5 dyne/cm (0.1 b/s), 40.3 dyne/cm (1 b/s), 41.2 dyne/cm (6.0 b/s) and 44.8 dyne/cm (20 b/s)

The data in Table 2 illustrate that various tartrate diesters have the ability to reduce the surface tension of an aqueous composition and that in many cases low surface tension can be maintained even under conditions in which surface is created at a rapid rate. Examples 14–25 demonstrate that tartrates containing alkyl groups of three to six carbon atoms exhibit surface tension values of less than 45 dyne/cm at a concentration of ≦5 wt. % in water at 25° C. and at 0.1 b/s. Furthermore, tartrates containing alkyl groups with three to five carbon atoms demonstrate a reduction in the dynamic surface tension of aqueous solutions of less than 40 dyne/cm under more dynamic conditions (6 b/s) and at a concentration of ≦5 wt. % in water at 25 ° C. In comparison, C6 and greater tartrates perform poorly under these conditions. Moreover, tartrates containing alkyl groups with five carbon atoms can achieve dynamic surface tension reduction of aqueous compositions of less than 40 dyne/cm at 6 b/s at a concentration of 0.1 wt. % surfactant. Surprisingly, tartrates which contain C5 groups exhibit an optimum combination of effectiveness and efficiency with surface tension reduction of less than 42 dyne/cm at very fast surface creation rates (20 b/s) at a concentration of <0.5 wt. % surfactant.

Overall, tartrates containing C5 to C3 alkyl groups exhibit limiting dynamic surface tension values <42 dyne/cm at both low surface creation rates (0.1 b/s) and high surface creation rates (20 b/s). Specifically, dipentyl-DL-tartrate, diisoamyl-DL-tartrate, di(2-methyl-butyl)-DL-tartrate and dineopentyl-DL-tartrate are very efficient at reducing dynamic surface tension. This characteristic is evidenced by pC$_{20}$ values for these compounds of 3.3, 3.7, 3.2 and 3.5, respectively. Moreover, the high efficiency of dipentyl-DL-tartrate, diisoamyl-DL-tartrate, di(2-methyl-butyl)-DL-tartrate and dineopentyl-DL-tartrate is evidenced by the surface tension data for 0.1 wt. % compositions of these surfactants which are capable of maintaining a surface tension <40 dyne/cm at relatively high surface creation rates (6 b/s). In contrast, diisopropyl-(D)-tartrate is a very effective, but not very efficient surfactant. Although diisopropyl-(D)-tartrate is capable of maintaining a surface tension <42 dyne/cm at very fast rates 20 b/s, 5 wt % surfactant is required to reduce the surface tension to a similar value obtained for 0.1 to 0.5 wt % solutions of C5 dialkyltartrates (Examples 18–21). Thus, the C5 alkyl groups have optimum carbon to confer sufficient surface activity (i.e. efficiency) to the material but not enough carbon to decrease the solubility to the extent that the ability of the material to reduce surface tension is insufficient for a particular application (i.e. effectiveness).

Unexpected differences in the performance of tartrates containing the same number of carbon atoms were observed. Particularly, branching was found to improve both the efficiency and effectiveness of the C5 dialkyl tartrate surfactants under very dynamic conditions (20 b/s). For example, the terminal branching present in diisoamyl-DL-tartrate and dineopentyl-DL-tartrate accounts for a decrease in the limiting surface tension of 1.3 and 3.2 dyne/cm at 20 b/s, respectively, in comparison to dipentyl-L-tartrate. Therefore, of the C5 dialkyltartrates consistent with this invention, those which contain alkyl chain branching are the most preferred for the reduction of surface tension of water in water-based, organic compound containing compositions, including waterborne coatings, inks, adhesives, fountain solutions and agricultural formulations. However, ultimately the choice of tartrate will depend upon the application.

EXAMPLES 26–38

The foaming properties of a 0.1 wt % solution of the comparative example (nonylphenol 9.5 mole ethoxylate) and various dialkyltartrates (diisopropyl-(D)-tartrate, dibutyl-L-tartrate, diisobutyl-DL-tartrate, di-sec-butyl-DL-tartrate, dipentyl-DL-tartrate, diisoamyl-DL-tartrate, di-(2-methyl-butyl)-DL-tartrate, dineopentyl-DL-tartrate, dihexyl-DL-tartrate, di-(4-methyl-2-pentyl)-DL-tartrate, dibenzyl-DL-tartrate and di-(2-ethyl-hexyl)-DL-tartrate) were examined using a procedure based upon ASTM D 1173-53. In this test, a 0.1 wt % solution of the surfactant is added from an elevated foam pipette to a foam receiver containing the same solution. The foam height is measured at the completion of the addition ("Initial Foam Height") and the time required for the foam to dissipate at the air-liquid interface ("Time to 0 Foam") is recorded. This test provides a comparison between the foaming characteristics of various surfactants. In general, in coatings, inks, adhesives and agricultural formulations, foam is undesirable because is complicates handling and can lead to coating and print defects, and to inefficient application of agricultural materials.

TABLE 3

Foam Test Data

| | Structure | initial foam (cm) | time to zero foam |
|---|---|---|---|
| Example 26 | nonylphenol 9.5 mole ethoxylate | 4.5 | >5 min[a] |
| Example 27 (Example 1) | diisopropyl tartrate | 2.9 | 11 sec |
| Example 28 (Example 2) | dibutyl tartrate | 1.0 | 5 min |
| Example 29 (Example 3) | diisobutyl tartrate | 0.5 | 0.3 sec |
| Example 30 (Example 4) | di-sec-butyl tartrate | 1.7 | 0.4 sec |
| Example 31 (Example 5) | dipentyl tartrate | 0 | 0 |
| Example 32 (Example 6) | diisopentyl tartrate | 0 | 0 |
| Example 33 (Example 7) | di(2-methylbutyl) tartrate | 0 | 0 |

TABLE 3-continued

Foam Test Data

| | Structure | initial foam (cm) | time to zero foam |
|---|---|---|---|
| Example 34 (Example 8) | 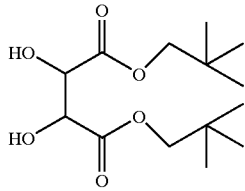 | 0 | 0 |
| Example 35 (Example 9) | 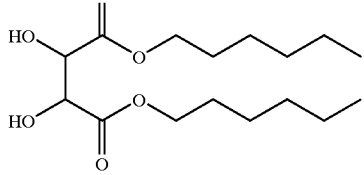 | 1.3 | 0.1 sec |
| Example 36 (Example 10) | 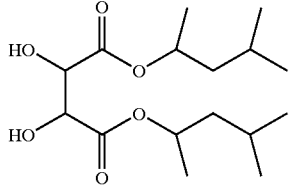 | 0.8 | 0.3 sec |
| Example 37 (Example 11) | 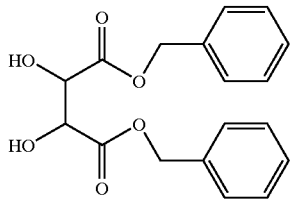 | 1.3 | 0.1 sec |
| Example 38 (Example 12) | 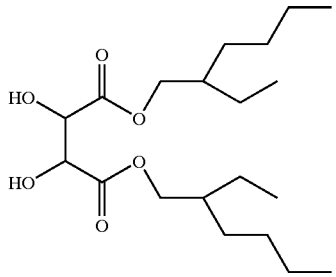 | 0 | 0 |

<sup>a</sup>3.7 cm of foam were still present

As illustrated, the ability to control foam is advantageous in many applications, including coatings, inks, adhesives, fountain solutions, agricultural formulations, soaps, detergents, food processing and so on. The results for the tartrates prepared in Examples 1–12 are reported in Table 3 along with comparative data for the 9.5 mole ethoxylate of nonylphenol. A drawback to the use of conventional surfactants such as the 9.5 mole ethoxylate of nonylphenol in coatings, inks, adhesives, and agricultural formulations is the formation of considerable quantities of long-lasting foam in these systems. For such applications, it is desired that a surfactant forms little foam and that the foam which forms dissipates quickly. The data in Table 3 show that the compounds of this invention form very little foam or no measurable foam, and that the foam which forms dissipates quickly. Moreover, all of these materials form less initial foam and many form faster breaking foam than the current art. Surprisingly, C3, C4 and C6 dialkyl tartrates produced more initial foam and longer lasting foam than the C5 dialkyl tartrates. Therefore, tartaric acid diester surfactants prepared from alcohols containing 5 carbon atoms are preferred as low-foaming surfactants. Overall, in addition to their ability to reduce the surface tension of organic-containing aqueous compositions, these materials have desirable foam properties with respect to their use in coatings, inks, adhesives and agricultural formulations.

EXAMPLES 39–51

The ultimate biodegradability of various dialkyltartrates (diisopropyl-(D)-tartrate, dibutyl-DL-tartrate, diisobutyl-DL-tartrate, di-sec-butyl-DL-tartrate, dipentyl-DL-tartrate, diisoamyl-DL-tartrate, di-(2-methyl-butyl)-DL-tartrate, dineopentyl-DL-tartrate, dihexyl-DL-tartrate, di-(4-methyl-2-pentyl)-DL-tartrate, dibenzyl-DL-tartrate and di-(2-ethyl-hexyl)-DL-tartrate) is illustrated in Table 4. Assessment of biodegradability of these compounds was made using the Carbonaceous Biological Demand test at 5 days (CBOD5) and at 28 days (CBOD28). The test samples were weighed out and solubilized in Milli-Q water with a target total organic carbon (TOC) content of 100 mg/L. The chemical oxygen demand (COD) was measured on these solutions as a measure of the complete oxidation or Ultimate Biological Oxygen Demand (UBOD). These prepared samples were submitted in triplicate to Benchmark Analytics, Center Valley, Pa. for 5 day and 28 day CBOD tests using a biomass seed from a Easton, Pa. Wastewater Treatment Plant which was not acclimatized to the compounds of this invention. Each measurement (5 day and 28 day CBOD) was run three times for each compound to confirm reproducibility. The results from the CBOD tests at 5 and 28 days were divided by the COD results for each respective solution and multiplied by 100 to calculate a percent biodegradation. A glucose/glutamic acid solution, which is readily biodegradable, was run as a positive control to check biomass health. This is the preferred control for BOD tests as listed in the Standard Methods. Examples which showed very low biodegradation which was below the limit of detection for the test (<24 mg/L or <8% biodegradation) are reported as 0% degraded in Table 4.

For compounds that are extremely biodegradable a high percent biodegradation is usually seen in the CBOD5 measurement, even when using unacclimatized biomass. However, most compounds require a longer period of time during which the degrading organisms develop enzyme systems to utilize the test material as a food source. For these compounds, a higher oxygen demand is seen at 28 days. Compounds with high (i.e. greater than 60%) biodegradation after 28 days may be considered easily biodegraded.

TABLE 4

Biodegradation Data

| | Structure | Trial | Percent Biodegradation at 5 days | Trial | Percent Biodegradation at 28 days |
|---|---|---|---|---|---|
| Example 39 (Example 1) | | 1<br>2<br>3<br>average | $0^a$<br>$0^a$<br>$0^a$<br>0 | 4<br>5<br>6<br>average | 9<br>10<br>9<br>9 |
| Example 40 (Example 2) | | 1<br>2<br>3<br>average | 7<br>9<br>8<br>8 | 4<br>5<br>6<br>average | 61<br>56<br>59<br>59 |
| Example 41 (Example 3) | | 1<br>2<br>3<br>average | 3<br>0<br>6<br>3 | 4<br>5<br>6<br>average | 6<br>43<br>22<br>30 |
| Example 42 (Example 4) | | 1<br>2<br>3<br>average | $0^a$<br>$0^a$<br>$0^a$<br>0 | 4<br>5<br>6<br>average | 6<br>5<br>5<br>6 |

TABLE 4-continued

Biodegradation Data

| | Structure | Trial | Percent Biodegradation at 5 days | Trial | Percent Biodegradation at 28 days |
|---|---|---|---|---|---|
| Example 43 (Example 5) | | 1<br>2<br>3<br>average | 6<br>6<br>17<br>9 | 4<br>5<br>6<br>average | 58<br>63<br>56<br>59 |
| Example 44 (Example 6) | | 1<br>2<br>3<br>average | 17<br>8<br>13<br>13 | 4<br>5<br>6<br>average | 64<br>56<br>53<br>58 |
| Example 45 (Example 7) | | 1<br>2<br>3<br>average | 17<br>6<br>0<br>8 | 4<br>5<br>6<br>average | 63<br>69<br>98<br>77 |
| Example 46 (Example 8) | | 1<br>2<br>3<br>average | 0[a]<br>0[a]<br>0[a]<br>0 | 4<br>5<br>6<br>average | 15<br>8<br>24<br>16 |
| Example 47 (Example 9) | | 1<br>2<br>3<br>average | 0<br>21<br>22<br>15 | 4<br>5<br>6<br>average | 93<br>69<br>100<br>87 |
| Example 48 (Example 10) | | 1<br>2<br>3<br>average | 0[a]<br>0[a]<br>0[a]<br>0 | 4<br>5<br>6<br>average | 10<br>11<br>9<br>10 |
| Example 49 (Example 11) | | 1<br>2<br>3<br>average | 25<br>24<br>34<br>28 | 4<br>5<br>6<br>average | 52<br>45<br>70<br>56 |

TABLE 4-continued

Biodegradation Data

| Structure | Trial | Percent Biodegradation at 5 days | Trial | Percent Biodegradation at 28 days |
|---|---|---|---|---|
| Example 50 (Example 12) 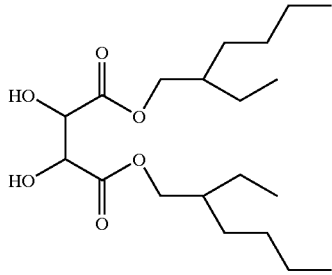 | 1 | 100 | 4 | 100 |
| | 2 | 27 | 5 | 100 |
| | 3 | 58 | 6 | 100 |
| | average | 62 | average | 100 |
| Example 51  glucose/glutamic acid control | 1 | 67 | 4 | 100 |
| | 2 | 61 | 5 | 84 |
| | 3 | 61 | 6 | 83 |
| | average | 63 | average | 84 |

[a]Biodegradation that was below the detection limit of the test (<24 mg/L or <8% biodegradation)

The results of these studies show that dibutyl-DL-tartrate, dipentyl-DL-tartrate, diisoamyl-DL-tartrate, di-(2-methyl-butyl)-DL-tartrate, dihexyl-DL-tartrate, dibenzyl-DL-tartrate and di-(2-ethyl-hexyl)-DL-tartrate all exhibit greater than 60% biodegradation after 28 days in at least one of the trial runs. Surprisingly, those tartrates containing oxygen atoms attached at a terminal position demonstrate significantly more percent biodegradation than the corresponding tartrates containing an oxygen atom which was attached at an internal position on the alkyl group. For example, diisopropyl-(D)-tartrate, di-sec-butyl-DL-tartrate and di-(4-methyl-2-pentyl)-DL-tartrate were degraded only 5–11% after 28 days. In addition, those tartrates which contain quaternary carbons exhibit poor biodegradation characteristics. Particularly, dineopentyl-DL-tartrate exhibited 8–24% biodegradation after 28 days. Another unexpected result was that tartrates with short alkyl chains demonstrated less biodegradation. For the purposes of this invention, those tartrates which exhibit greater than 60% biodegradation are preferred.

From these data, it can be concluded that many tartrate surfactants are easily biodegraded, with the exception of those made from secondary alcohols and those with quaternary carbons. In addition, significant degradation after 28 days suggests that these compounds are not expected to persist or bioaccumulate in the natural environment. Moreover, it should be emphasized that the tests used for the materials of this invention are very stringent biodegradation screening tests and higher degrees of biodegradation are likely for longer-term tests, tests using acclimatized biomass and under the conditions of a well-maintained wastewater treatment plant.

STATEMENT OF INDUSTRIAL APPLICATION

The invention provides compositions suitable for reducing the equilibrium and dynamic surface tension in water-based coating, ink, adhesive, fountain solution and agricultural compositions.

We claim:

1. An aqueous composition which is essentially free of hydrocarbon solvent comprising in water an inorganic compound which is a mineral ore or a pigment or an organic compound which is a pigment, a polymerizable monomer, an oligomeric resin, a polymeric resin, a detergent, a herbicide, an insecticide, a fungicide, or a plant growth modifying agent and an effective amount of a tartrate diester for reducing the dynamic surface tension of the composition, the tartrate diester having the structure:

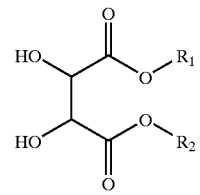

where $R_1$ and $R_2$ are a C5 to C6 alkyl group.

2. The aqueous composition of claim 1 in which an aqueous solution of the tartrate diester demonstrates a dynamic surface tension of less than 45 dynes/cm at a concentration of ≦5 wt % in water at 25° C. and 20 bubbles/second according to the maximum-bubble-pressure method and the tartrate diester is present at 0.01 to 10 wt % of the aqueous composition.

3. The aqueous composition of claim 1 in which $R_1$ and $R_2$ are a C5 alkyl group.

4. The aqueous composition of claim 3 in which the alkyl group is isoamyl.

5. The aqueous composition of claim 3 in which the alkyl group is n-pentyl.

6. The composition of claim 1 which is an aqueous organic coating composition comprising in an aqueous medium 30 to 80 wt % of a coating composition which comprises the following components 0 to 50 wt % pigment dispersant, grind resin or mixtures thereof;

0 to 80 wt % coloring pigment, extender pigment, anti-corrosive pigment, other pigment types or mixtures thereof;

5 to 99.9 wt % water-borne, water-dispersible or water-soluble resin or mixtures thereof;

0 to 30 wt % slip additive, antimicrobial agent, processing aid, defoamer or mixtures thereof;

0 to 50 wt % coalescing or other solvent;

0.01 to 10 wt % surfactant, wetting agent, flow and leveling agents or mixtures thereof; and 0.01 to 20 wt % tartrate diester.

7. The composition of claim 1 which is an aqueous ink composition comprising in an aqueous medium 20 to 60 wt % of an ink composition which comprises the following components 1 to 50 wt % pigment;

0 to 50 wt % pigment dispersant, grind resin or mixtures thereof;

0 to 50 wt % clay base in a resin solution vehicle;

5 to 99 wt % water-borne, water-dispersible or water-soluble resin or mixtures thereof;

0 to 30 wt % coalescing or other solvent;

0.01 to 10 wt % processing aid, defoamer, solubilizing agent or mixtures thereof;

0.01 to 10 wt % surfactant, wetting agent or mixtures thereof; and 0.01 to 20 wt % tartrate diester.

8. The composition of claim 1 which is an aqueous agricultural composition comprising in an aqueous medium 0.01 to 80 wt % of an agricultural composition which comprises the following components 0.1 to 50 wt % a herbicide, insecticide, plant growth modifying agent or mixtures thereof;

0.01 to 10 wt % surfactant;

0 to 5 wt % dye;

0 to 20 wt % thickener, stabilizer, co-surfactant, gel inhibitor, defoaming agent or mixtures thereof;

0 to 25 wt % antifreeze; and 0.01 to 50 wt % tartrate diester.

9. The composition of claim 1 which is an aqueous fountain solution composition comprising the following components 0.05 to 10 wt % film formable, water soluble macromolecule;

1 to 25 wt % alcohol, glycol, or polyol with 2–12 carbon atoms which is water soluble or can be made water soluble;

0.01 to 20 wt % water soluble organic acid, inorganic acid, or a salt thereof;

30 to 70 wt % water; and 0.01 to 5 wt % tartrate diester.

10. The composition of claim 1 which is an aqueous adhesive composition comprising in an aqueous medium 30 to 65 wt % of an adhesive composition which comprises the following components 50 to 99 wt % polymeric resin;

0 to 50 wt % tackifier;

0 to 0.5 wt % defoamer; and 0.5 to 2 wt % tartrate diester.

11. In an aqueous composition which is essentially free of hydrocarbon solvent and is selected from the group consisting of aqueous organic protective or decorative coating, ink, adhesive, fountain solution and agricultural compositions and contains an effective amount of a tartrate diester for reducing the dynamic surface tension of the composition, the tartrate diester having the structure:

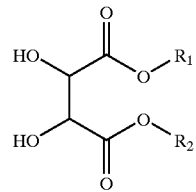

where $R_1$ and $R_2$ are a C5 to C6 alkyl group.

12. The aqueous composition of claim 11 in which $R_1$ and $R_2$ are a C5 alkyl group.

13. The aqueous composition of claim 12 in which the alkyl group is isoamyl.

14. The aqueous composition of claim 12 in which the alkyl group is n-pentyl.

15. In an aqueous composition which is essentially free of hydrocarbon solvent and is selected from the group consisting of aqueous adhesive, fountain solution and agricultural compositions and contains an effective amount of a tartrate diester for reducing the dynamic surface tension of the composition, the tartrate diester having the structure:

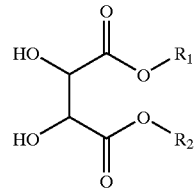

where $R_1$ and $R_2$ are a C4 alkyl group.

16. The aqueous composition of claim 15 in which the alkyl group is n-butyl.

17. The aqueous composition of claim 15 in which the alkyl group is isobutyl.

18. In an aqueous organic protective or decorative coating composition which comprises an aqueous medium which is at least 90 wt % water and is essentially free of hydrocarbon solvent and contains an effective amount of a tartrate diester for reducing the dynamic surface tension of the composition, the tartrate diester having the structure:

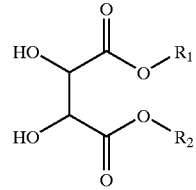

where $R_1$ and $R_2$ are a C4 alkyl group.

19. The aqueous composition of claim 18 in which the alkyl group is n-butyl.

20. The aqueous composition of claim 18 in which the alkyl group is isobutyl.

21. The composition of claim 18 which is an aqueous organic coating composition comprising in an aqueous medium 30 to 80 wt % of a coating composition which comprises the following components 0 to 50 wt % pigment dispersant, grind resin or mixtures thereof;

0 to 80 wt % coloring pigment, extender pigment, anti-corrosive pigment, other pigment types or mixtures thereof;

5 to 99.9 wt % water-borne, water-dispersible or water-soluble resin or mixtures thereof;

0 to 30 wt % slip additive, antimicrobial agent, processing aid, defoamer or mixtures thereof;

0 to 50 wt % coalescing or other solvent;

0.01 to 10 wt % surfactant, wetting agent, flow and leveling agents or mixtures thereof; and 0.01 to 20 wt % tartrate diester.

22. The composition of claim 15 which is an aqueous agricultural composition comprising in an aqueous medium 0.01 to 80 wt % of an agricultural composition which comprises the following components 0.1 to 50 wt % a herbicide, insecticide, plant growth modifying agent or mixtures thereof;

0.01 to 10 wt % surfactant;

0 to 5 wt % dye;

0 to 20 wt % thickener, stabilizer, co-surfactant, gel inhibitor, defoaming agent or mixtures thereof;

0 to 25 wt % antifreeze; and 0.01 to 50 wt % tartrate diester.

23. The composition of claim 15 which is an aqueous fountain solution composition comprising the following components 0.05 to 10 wt % film formable, water soluble macromolecule;

1 to 25 wt % alcohol, glycol, or polyol with 2–12 carbon atoms which is water soluble or can be made water soluble;

0.01 to 20 wt % water soluble organic acid, inorganic acid, or a salt thereof;

30 to 70 wt % water; and 0.01 to 5 wt % tartrate diester.

24. The composition of claim 15 which is an aqueous adhesive composition comprising in an aqueous medium 30 to 65 wt % of an adhesive composition which comprises the following components 50 to 99 wt % polymeric resin;

0 to 50 wt % tackifier;

0 to 0.5 wt % defoamer; and 0.5 to 2 wt % tartrate diester.

* * * * *